(12) United States Patent
Potts et al.

(10) Patent No.: US 12,460,598 B1
(45) Date of Patent: Nov. 4, 2025

(54) SEAL FOR CYLINDER LINER ASSEMBLY AND METHOD FOR MAKING THE SAME

(71) Applicant: Caterpillar Inc., Peoria, IL (US)

(72) Inventors: Gregory O. Potts, Washington, IL (US); Martina Shubham Nipanikar, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/793,383

(22) Filed: Aug. 2, 2024

(51) Int. Cl.
*F02F 1/00* (2006.01)
*F02F 11/00* (2006.01)

(52) U.S. Cl.
CPC ............ *F02F 1/004* (2013.01); *F02F 11/005* (2013.01)

(58) Field of Classification Search
CPC ........... F02F 1/004; F02F 11/005; F16J 15/02
See application file for complete search history.

(56) References Cited

U.S. PATENT DOCUMENTS

| | | | |
|---|---|---|---|
| 2,378,045 A | 6/1945 | Sorensen et al. | |
| 3,167,320 A * | 1/1965 | Kyle | H01R 13/533 174/77 R |
| 3,209,659 A | 10/1965 | Colwell | |
| 3,432,177 A | 3/1969 | Colwell | |
| 3,485,142 A * | 12/1969 | Allen | F02F 11/005 92/169.1 |
| 3,853,099 A * | 12/1974 | Feather | F02F 11/005 123/41.82 R |
| 4,486,002 A * | 12/1984 | Riess | F16K 41/043 277/529 |
| 4,513,978 A | 4/1985 | Nicholson | |
| 4,877,272 A * | 10/1989 | Chevallier | F16J 15/0887 285/212 |
| 5,947,481 A | 9/1999 | Young | |
| 8,601,995 B2 * | 12/2013 | Worthington | F02F 1/004 123/193.2 |
| 2009/0072494 A1 * | 3/2009 | Smith | F16J 15/125 277/625 |
| 2017/0226958 A1 * | 8/2017 | Cline | F02F 1/004 |
| 2020/0340583 A1 * | 10/2020 | Whitehead | F16J 15/062 |
| 2022/0057031 A1 * | 2/2022 | Gattringer | F16L 21/03 |
| 2022/0099184 A1 * | 3/2022 | Rockwell | F16J 15/022 |

FOREIGN PATENT DOCUMENTS

JP    61118549 A * 6/1986   ............ F02F 11/005

* cited by examiner

Primary Examiner — Grant Moubry

(57) ABSTRACT

A cylinder liner seal includes an annular seal body defining a seal center axis, a first seal surface, and a second seal surface positioned opposite to the first seal surface. The first seal surface is contoured to form a first plurality of seal beads extending circumferentially around the seal center axis, and the second seal surface is contoured to form a second plurality of seal beads extending circumferentially around the seal center axis. Each of the first plurality of seal beads and the second plurality of seal beads define a plurality of peaks alternating with a plurality of troughs together forming a sinusoidal profile. A cylinder liner assembly and methodology of making the same are also disclosed.

8 Claims, 3 Drawing Sheets

SEAL FOR CYLINDER LINER ASSEMBLY AND METHOD FOR MAKING THE SAME

TECHNICAL FIELD

The present disclosure relates generally to a cylinder liner assembly, and more particularly to a seal for a cylinder liner assembly and a method for making a cylinder liner assembly.

BACKGROUND

Many machine components and systems, such as internal combustion engines, utilize various seals. Cylinder liners provide a smooth inner surface forming a cylinder bore, facilitating piston movement and commonly providing oil to the piston, while withstanding compression and temperatures. Together the piston, cylinder head, and cylinder liner form the combustion chamber where a fuel-air mixture ignites and expands, generating power, with the piston reciprocating to utilize the energy from combustion to produce mechanical work via a rotatable crankshaft.

Cylinder liner seals are a component utilized to ensure a tight seal between a cylinder liner and a cylinder block. Utilization of a seal facilitates prevention of leakage of coolant or lubricants into the combustion chamber or elsewhere among components of the engine. Effective sealing may also prevent contamination or loss of engine fluids. However, cylinder liner seals may experience failure due to degradation over time, pressure differentials, or other factors. Conventional O-rings have been used on cylinder liners, but are not used on others due to spatial constraints or other considerations. Rectangular-shaped seals within the art can function adequately but limit the ability to modify the seal cross section to optimize sealing, potentially resulting in flash at or near the sealing location. One known design for gasket sealing in the vicinity of a cylinder liner is set forth in U.S. Pat. No. 4,513,978.

SUMMARY

In one aspect, a cylinder liner assembly includes a cylinder liner having a cylinder liner body defining a center axis, and a seal groove formed in the cylinder liner body extending circumferentially around the center axis. The cylinder liner also includes a seal seated in the seal groove and having a plurality of inner seal beads extending in parallel with one another circumferentially around the center axis and in sealing contact with the cylinder liner body, and a plurality of outer seal beads.

In another aspect, a cylinder liner seal includes an annular seal body defining a seal center axis, a first seal surface, and a second seal surface positioned opposite to the first seal surface. The first seal surface is contoured to form a first plurality of seal beads extending circumferentially around the seal center axis, and the second seal surface is contoured to form a second plurality of seal beads extending circumferentially around the seal center axis. Each of the first plurality of seal beads and the second plurality of seal beads define a plurality of peaks alternating with a plurality of troughs together forming a sinusoidal profile.

In yet another aspect, a method of making a cylinder liner assembly includes deforming an annular cylinder liner seal in opposition to an internal bias from a flat configuration to a cylindrical configuration. The method further includes stretching the annular cylinder liner seal over a flange portion of a cylinder liner and seating the annular cylinder liner in a seal groove of the cylinder liner, in the cylindrical configuration, such that seal beads of the cylinder liner seal contact an outer surface of the cylinder liner to define a plurality of sealing locations upon the cylinder liner.

DETAILED DESCRIPTION

Figure 1:
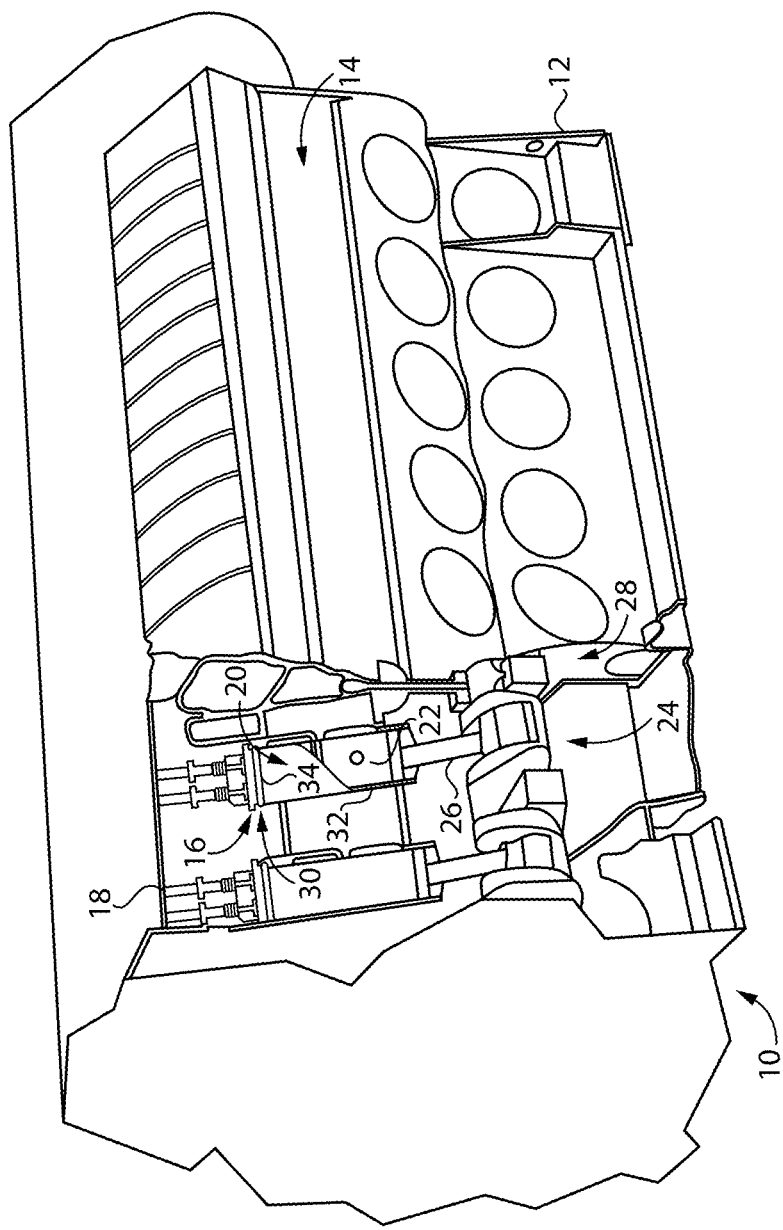
FIG. 1 is a partially sectioned view, in perspective, of an engine assembly including a cylinder liner assembly, according to one embodiment.

Referring to FIG. 1, there is shown an engine assembly 10, according to one embodiment. Engine assembly 10 includes an internal combustion engine 12 (hereafter "engine 12"), such as a diesel engine. Engine 12 may include a spark ignition engine or another compression ignition engine, including but not limited to a gasoline engine, a natural gas engine, a homogeneous charge compression ignition engine, a reactivity controlled compression ignition engine, or still other engine types known in the art. Engine 12 may be used to power a machine such as an on-highway truck, an off-highway truck, a loading machine, an earth moving machine, a locomotive, or an electric generator and still others. Engine 12 may also include a cylinder block 14 having a number of cylinders 16 defined therein. Cylinders 16 may be arranged in any configuration such as inline, radial, "V", and so on. It should be noted that a number of cylinders 16 associated with engine 12 may vary. Accordingly, engine 12 may include 4 cylinders, 6 cylinders, 8 cylinders, 12 cylinders, 16 cylinders, or 20 cylinders, for example. A cylinder head 18 may further close off each cylinder 16. A single cylinder, or alternatively, two or more cylinders, may be associated with cylinder head 18 such as where cylinder head 18 is arranged in multiple cylinder head sections. Additionally, engine 12 may include various other components and/or systems (not shown) such as a fuel system, an air intake system, an exhaust system, an exhaust gas recirculation system, an aftertreatment system, and so on.

A combustion chamber 20 is formed within each cylinder 16 of engine 12, and further includes a piston 22 movably disposed within each of cylinders 16. Each of pistons 22 may be coupled to a crankshaft 24 of engine 12, via a connecting rod 26. Crankshaft 24 may be mounted within a crankcase 28 of engine 12. During operation of engine 12, combustion of an air-fuel mixture within combustion chamber 20 provides the power to drive piston 22 away from cylinder head 18, in a reciprocating manner. Energy from combustion of the air-fuel mixture inside cylinders 16 may be converted to rotational energy of the crankshaft 24 by pistons 22. Reciprocation of pistons 22 during operation of engine 12 requires a durable surface for piston guiding and heat dissipation during combustion. Further, lubricants and/or coolants may be circulated throughout engine assembly 10 to reduce friction, regulate operating temperature and prevent overheating of components within engine 12. Engine assembly 10 may require sealing to prevent leakage of coolant between cylinder block 14 and cylinders 16. Accordingly, engine assembly 10 may further include a cylinder liner assembly 30 disposed within each cylinder 16. As will be further apparent from the following description, cylinder liner assembly 30 is uniquely structured for sealing about cylinder 16 and prevention of leakage of coolant when installed for service.

Figure 2:
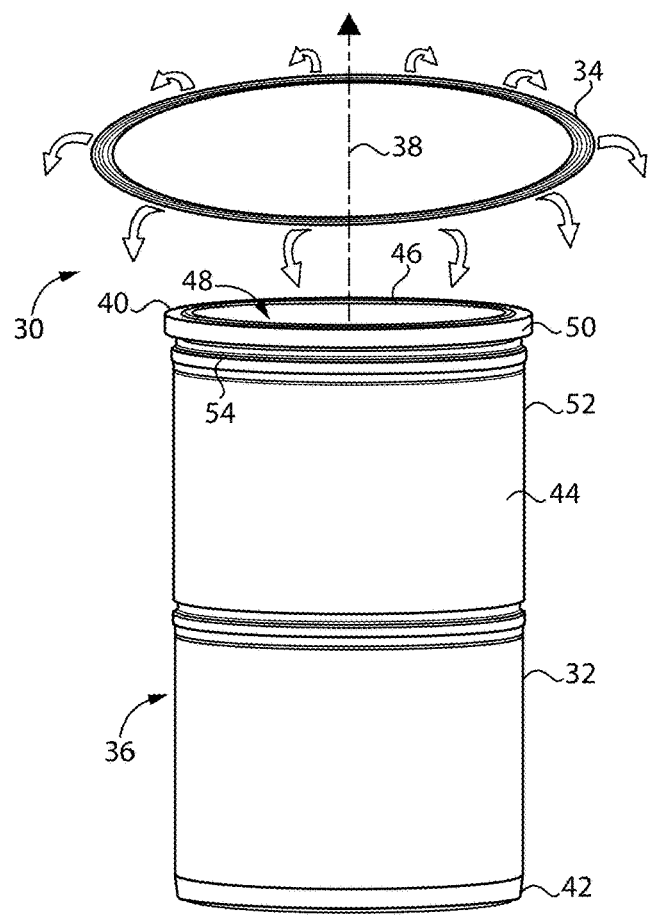
FIG. 2 is a perspective view of a cylinder liner assembly for an engine assembly as in FIG. 1.

Referring also to FIG. 2, shown is a cylinder liner assembly 30 according to one embodiment. Cylinder liner assembly 30 may include cylinder liner 32 and a cylinder liner seal 34 positioned upon cylinder liner 32. Cylinder liner 32 includes a liner body 36 defining a liner center axis 38 extending between a first axial liner end 40 and a second axial liner end 42. Liner body 36 includes an outer liner surface 44, and an inner liner surface 46 defining a liner bore 48 therein structured to house piston 22, such that during operation of engine 12, piston 22 moves within liner bore 48. Liner body 36 may further include a flange portion 50, and a generally cylindrical skirt portion 52, each extending circumferentially around liner center axis 38. Cylinder liner 32 may be formed from a metallic material such as cast iron, steel, and still others.

Cylinder liner 32 further includes a seal groove 54 formed in skirt portion 52 of liner body 36, typically adjacent to and extending to flange portion 50. Seal groove 54 extends circumferentially around liner center axis 38. It will be appreciated that a variety of configurations of seal groove 54 are contemplated, provided when a cylinder liner seal 34 is installed for service, cylinder liner seal 34 provides sealing contact between cylinder block 14 and cylinder liner 32. For example, seal groove 54 may be formed upon skirt portion 52 of cylinder liner 32 when housed within cylinder block 14. In another example seal groove 54 may be formed within cylinder block 14, provided that when cylinder block 14 receives cylinder liner 32, seal groove 54 is positioned between skirt portion 52 and cylinder block 14.

Figure 3:
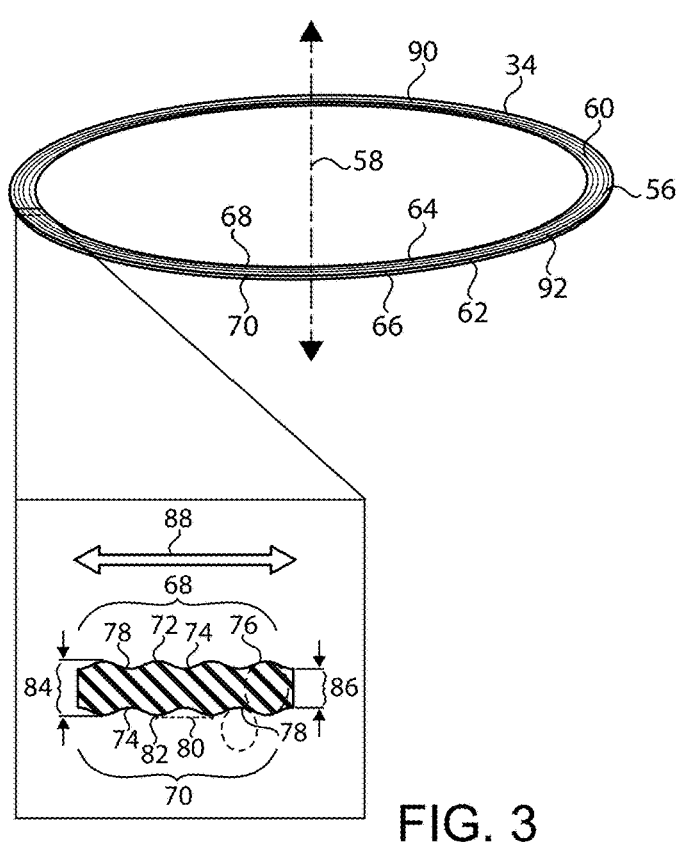
FIG. 3 is a perspective view of a cylinder liner seal, including a detailed enlargement, according to one embodiment.

Referring also now to FIG. 3, shown in further detail is a cylinder liner seal 34 according to one embodiment. Cylinder liner seal 34 is structured to be deformable, at least initially in opposition to an internal bias, from an axially oriented flat configuration to a cylindrical configuration when installed for service. It should be understood within the context of the present description that the flat configuration refers to the orientation of cylinder liner seal 34 relative to liner center axis 38. In the axially oriented flat configuration opposite sealing surfaces of cylinder liner seal 34 face opposite axial directions. Cylinder liner seal 34 defines its own center axis, notwithstanding its shared axis with cylinder liner, as further discussed herein.

Cylinder liner seal 34 ("hereafter liner seal 34"), includes an annular, non-metallic seal body 56 defining a seal center axis 58 extending from a first axial seal end 60 to a second axial seal end 62. Seal body 56 may be formed of any suitable material, such as natural or synthetic rubber materials, elastomers, or still others. Seal body 56 includes a first seal surface 64, and a second seal surface 66 positioned opposite to first seal surface 64, each extending circumferentially around seal center axis 58. Each of first seal surface 64 and second seal surface 66 are contoured to form a plurality of seal beads 68,70. Various numbers of seal beads are within the scope of the present disclosure, contingent upon sealing requirements and manufacturing requirements, for example. In one example, first plurality of seal beads 68 and second plurality of seal beads 70 may include a total number of at least 6 seal beads. In a refinement, first plurality of seal beads 68 may include a total of 4 seal beads and second plurality of seal beads 70 includes a total of 4 seal beads, although the present description is not limited to such.

Each of first plurality of seal beads 68 and second plurality of seal beads 70, may extend in parallel with one another circumferentially around seal center axis 58 and define a plurality of peaks 72 alternating with a plurality of troughs 74 together forming a sinusoidal profile. It should be noted that the term "sinusoidal profile" in the present description denotes a surface pattern of first seal surface and second seal surface, generally regarded as smooth, having regular undulations resembling a sine wave. Distances or increments along each first seal surface and second seal surface may be referred to as periods, which can either be full or half, depending on the arrangement of each surface. Further, within this context, "sinusoidal" does not require a precise mathematical sine wave.

In the detailed enlargement of FIG. 3, first plurality of seal beads 68 may axially align with second plurality of seal beads 70, defining an outer radius 76 at each respective one of the aligned peaks 72 and defining an inner radius 78 at each respective one of the aligned troughs 74. In one example, each outer radius 76 defined by each one of axially aligned peaks 72 is greater than each inner radius 78 defined by each one of axially aligned troughs 74. In another example, each respective one of the aligned plurality of peaks 72 defines an outer radius 76 of approximately 0.75 millimeters, and each respective one of the aligned plurality of troughs 74 defines an inner radius 78 of approximately 0.6 millimeters. Further, each of the defined peaks of first plurality of seal beads 68 and second plurality of seal beads 70, defines a radial bead distance 80 providing a spacing between a maximum peak height 82 of each of the aligned peaks 72. In one example, radial bead distance 80 between each maximum peak height 82 may be approximately 1.5 millimeters.

Seal body 56 further defines a major diameter dimension 84 and a minor diameter dimension 86. In the context of the present description, major diameter dimension 84 denotes a distance between maximum peak heights 82 of aligned peaks 72, and minor diameter dimension 86 denotes a distance between minimum trough heights 87 of aligned troughs 74. In one example, minor diameter dimension 86 is from approximately 65% to 75% of major diameter dimension 84. Seal body 56 further defines an axial length dimension 88. In yet another example, minor diameter dimension 86 is from 16% to 18% of axial length dimension 88. It should be noted that references to percentages and decimals within the present discussion acknowledge potential variability, as would be recognized by those skilled in the art. Percentages may exhibit a deviation of approximately 2-3% from those explicitly stated, while decimals may vary by ±0.2 millimeters.

Figure 4:
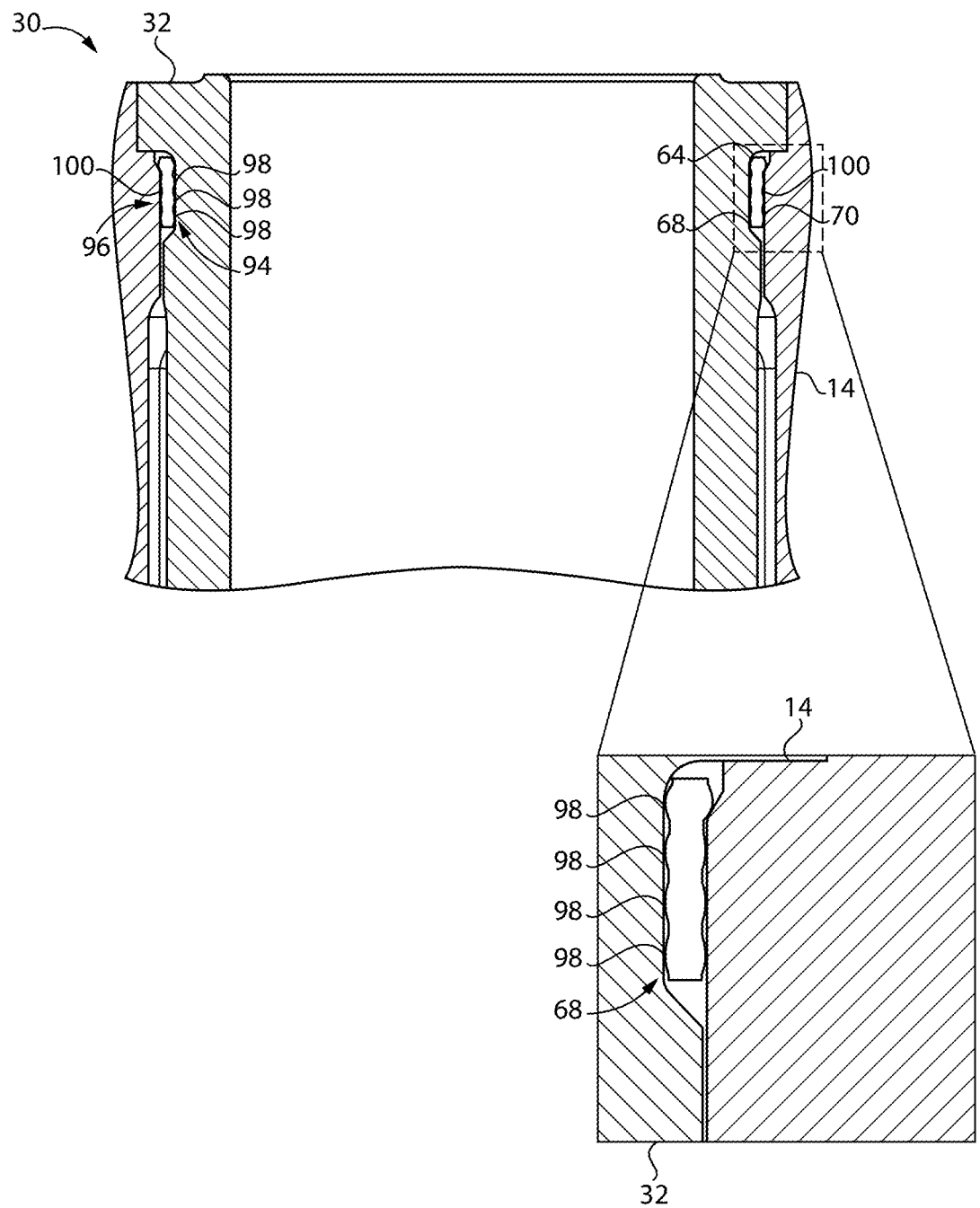
FIG. 4 is a sectioned view of a portion of a cylinder liner assembly, including a detailed enlargement, according to one embodiment.

As suggested above, liner seal 34 is designed to be positioned upon cylinder liner 32, with one of the pluralities of seal beads 68,70 in sealing contact with cylinder liner body 36. FIG. 3 illustrates seal body 56 in a biased flat configuration where the first plurality of seal beads 68 are upon a first axial side 90 of annular seal body 56, and the second plurality of seal beads 70 are upon a second axial side 92 of annular seal body 56. FIG. 4 illustrates liner seal 34 in a radially oriented installation position when deformed upon cylinder liner 32 for service. It should be noted that throughout deformation, each element upon liner seal 34 may remain generally consistent when the seal is in a cylindrically deformed configuration. Put differently, geometric relationships between or among features or parts of liner seal 34 discussed herein with regard to the biased flat axial configuration of seal body 56 will generally continue to apply to seal body 56 in the cylindrically deformed configuration. For clarity, upon deformation, first axial side 90 will be referred to as radially inward side 94, positioned toward cylinder liner 32, and correspondingly, second axial side 92 will be referred to as radially outward side 96, positioned toward cylinder block 14. Further, hereafter, each element upon liner seal 34 may be referred to as "inner" and "outer" respectively.

When making cylinder liner assembly 32, seal body 56 is deformed in opposition to an internal bias to a cylindrical configuration where inner seal beads 68 are upon radially inward side 94 of annular seal body 56 and outer seal beads 70 are upon radially outward side 96 of the annular seal body 56. The method further includes stretching liner seal 34 over flange portion 50 of cylinder liner 32 and seating liner seal 34 in seal groove 54 while in the cylindrical configuration. Liner seal 34 is seated in seal groove 54 such that inner seal beads 68 of liner seal 34 contact outer liner surface 44 to define a plurality of sealing locations 98 upon cylinder liner 32. It should be understood that the number of sealing locations may correspond to the number of seal beads utilized. Another way to understand this principle is that when radially inward side 94 of seal body 56 includes a total number of 4 seal beads, seal body 56 and cylinder liner 32 define four sealing locations therein, each sealing bead 68 positioned at a respective sealing location 98.

Making the cylinder liner assembly 30 further includes maintaining the cylindrical configuration at each of the respective sealing locations 98 once seated within the seal groove 54. Liner seal 34, may further include an applied low-friction coating 100 such as a polytetrafluorethylene (PTFE) coating, to provide a low-friction surface between cylinder block 14 and liner seal 34. Such coating 100 may be applied to outer seal beads 70, radially outward side 96, or potentially all of liner seal 34, contingent upon cylinder liner assembly 30 design. When liner seal 34 is positioned onto cylinder liner 32, low-friction coating 100 may facilitate low friction between cylinder block 14 and radially outward side 96, relative to radially inward side 94, thereby preventing pinch. As seen in the detailed enlargement of FIG. 4, when installed for service, a number of sealing beads 68,70 may be radially compressed, where other seal beads 68,70 may be radially compressed only in part or not at all. As seen in FIG. 4, the three bottommost seal beads 68, are radially compressed, while the uppermost seal bead 68 is only partially compressed or not at all. It should be understood that within the present discussion, "radially compressed only in part", denotes a radial compression less pronounced or more diminished compared to other radially compressed seal beads. It should further be understood that the number of radially compressed seal beads and the number of radially compressed seal beads only in part may be contingent upon sealing requirements.

INDUSTRIAL APPLICABILITY

Referring to the drawings generally, it will be recalled that a cylinder liner assembly 30 includes a cylinder liner 32 and a liner seal 34 having a plurality of seal beads 68,70. Liner seal 34 is deformed in opposition to an internal bias into a cylindrical configuration, forming a seal between cylinder block 14 and cylinder liner 32. In a practical implementation, liner seal 34 may be replaced by a service technician at recommended intervals as specified by a manufacturer or upon signs of wear or performance degradation indicated by inspection or observation of engine operation. Making cylinder liner assembly 30 may include deforming an annular cylinder liner seal 34, at least initially in opposition to an internal bias, from the flat rest configuration to the cylindrical configuration. Making cylinder liner assembly 30 may further include stretching the annular cylinder liner seal 34 over flange portion 50 of a cylinder liner 32 and seating the annular cylinder liner seal 34 in seal groove 54 of cylinder liner 32, in the cylindrical configuration, such that seal beads 68,70 of cylinder liner seal 34 contact an outer surface 44 of cylinder liner 32 to define a plurality of sealing locations 90 upon the cylinder liner 32. Liner seal 34 may further include an applied low-friction coating 100 such as a polytetrafluorethylene (PTFE) coating, to provide a low-friction surface between cylinder block 14 and liner seal 34. Low-friction coating 100 may be applied to radially outward side 96 and may aid in prevention of seal pinching when liner seal 34 is in the cylindrical configuration. Liner seal 34 may form an assembly with other components of cylinder liner assembly 30 and can be sold as an assembly. In other embodiments, liner seal 34 might be provided separately.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A cylinder liner assembly comprising:
   a cylinder liner having a cylinder liner body defining a center axis, and a seal groove formed in the cylinder liner body extending circumferentially around the center axis;
   a seal seated in the seal groove and formed as a one-piece body, and including a plurality of inner seal beads extending in parallel with one another circumferentially around the center axis and in sealing contact with the cylinder liner body, and a plurality of outer seal beads; and
   the seal is deformable in opposition to an internal bias from an axially oriented flat rest configuration to a cylindrical configuration.

2. The cylinder liner assembly of claim 1 wherein the inner seal beads axially align with the outer seal beads.

3. The cylinder liner assembly of claim 2 wherein each of the plurality of inner seal beads and the plurality of outer seal beads define a plurality of peaks alternating with a plurality of troughs together forming a sinusoidal profile.

4. The cylinder liner assembly of claim 2 wherein the outer seal beads include an applied polytetrafluorethylene (PTFE) coating.

5. The cylinder liner assembly of claim 1 wherein the cylinder liner further includes a flange portion and a skirt portion extending circumferentially around the center axis, and the seal groove is formed in the skirt portion and extends to the flange portion.

6. An engine assembly including the cylinder liner assembly of claim 1 and a cylinder block receiving the cylinder liner, and the seal groove is positioned between the skirt portion and the cylinder block.

7. A cylinder liner assembly comprising:
a cylinder liner having a cylinder liner body defining a center axis, and a seal groove formed in the cylinder liner body extending circumferentially around the center axis; and
a seal seated in the seal groove and including a plurality of inner seal beads formed by a first seal surface and extending in parallel with one another circumferentially around the center axis and in sealing contact with the cylinder liner body, and a plurality of outer seal beads formed by a second seal surface;
wherein the seal is formed of a seal material, and the seal material extends continuously from the first seal surface to the second seal surface.

8. A engine assembly comprising:
a cylinder block;
a cylinder liner located in the cylinder block, the cylinder liner defining a center axis and having a seal groove formed in the cylinder liner extending circumferentially around the center axis; and
a seal seated in the seal groove and including a plurality of inner seal beads extending in parallel with one another circumferentially around the center axis and in sealing contact with the cylinder liner body, and a plurality of outer seal beads;
the plurality of outer seal beads including one or more outer seal beads in a state of greater compression in contact with the cylinder block and one or more outer seal beads in a state of lesser compression in contact with the cylinder block.

\* \* \* \* \*